United States Patent [19]
Yano et al.

[11] Patent Number: 5,114,575
[45] Date of Patent: May 19, 1992

[54] OIL FILTER

[75] Inventors: Hisashi Yano, Yokohama; Junsuke Yabumoto, Atsugi; Ryuzi Kuwavara, Yokohama, all of Japan

[73] Assignee: Mitsubishi Oil Co., Ltd., Tokyo, Japan

[21] Appl. No.: 641,527

[22] Filed: Jan. 15, 1991

[30] Foreign Application Priority Data

Jan. 18, 1990 [JP] Japan ................................ 2-2667

[51] Int. Cl.⁵ .......................................... B01D 19/00
[52] U.S. Cl. .................................... 210/188; 210/304; 210/307; 210/315; 210/440; 210/512.1; 55/191; 55/204; 55/452
[58] Field of Search .............. 210/188, 304, 307, 315, 210/440, 512.1; 55/191, 204, 452

[56] References Cited

U.S. PATENT DOCUMENTS 4,997,556 3/1991 Yano et al. ......................... 210/136

*Primary Examiner*—W. Gary Jones
*Assistant Examiner*—Matthew O. Savage
*Attorney, Agent, or Firm*—Barnes & Thornburg

[57] ABSTRACT

An improvement in an oil filter is provided, the oil filter being of the type which comprise a housing opened at one end thereof, a cylindrical first separator unit disposed in the housing for removing solid contaminants from the oil introduced into the housing, and a second separator unit disposed within the first separator unit for removing gaseous contaminants from the oil that has passed through the first separator unit, the second separator unit including a funnel-shaped cyclone defining a chamber arranged to generate a vortical flow of the oil introduced therein to thereby separate gas-rich oil and a removal pipe extending into the chamber along an axial center thereof for discharging the gas-rich oil. The improvement comprises a wall of the cyclone defining the chamber having a lower portion and an upper portion, and a plurality of pores formed in the lower portion for allowing the oil to flow out of the cyclone. The removal pipe includes an upper end portion positioned above the lower portion of the wall of cyclone, the upper end portion being formed with a plurality of orifices for permitting the gas-rich oil to flow into the removal pipe. The pores and the orifices are arranged in such a manner that they do not overlap with each other in the axial direction of the chamber. The improved oil filter ensures a sufficient and smooth separation of the gaseous contaminants from the oil.

9 Claims, 2 Drawing Sheets

OIL FILTER

BACKGROUND OF THE INVENTION

1. Field of the Invention

The present invention relates to an oil filter to be incorporated in a lubricating system for an internal combustion engine or the like and, more particularly, to an improvement in an oil filter of the type which can remove not only solid contaminants but also gaseous contaminants from the oil.

2. Description of the Prior Art

In machinery for construction, transportation and the like using lubricant, such as engines and various hydraulic devices, solid contaminants and gaseous contaminants have hitherto been removed from lubricant by separate devices and/or in different portions of the machinery. An integrated device has thus been desired which can remove both of the solid and gaseous contaminants effectively and which can be installed in a limited space of the machinery.

The inventors herein have proposed such an integrated device which is disclosed in a U.S. Pat. No. 4,865,632 owned by Mitsubishi Oil Co., Ltd. and issued Sep. 12, 1989. The device comprises a first separator for filtering lubricant which is pumped into a housing to thereby remove solid contaminants, and a second separator for removing gaseous contaminants from the filtered oil by utilizing a centrifugal force. Specifically, the second separator has a chamber adapted to generate a vortical flow of the lubricant introduced therein, whereby the lubricant having little gaseous contaminants and therefore having a larger specific gravity gathers in a peripheral area of the chamber while gas-rich lubricant having a smaller specific gravity gathers in a central area. A funnel-shaped wall defining the chamber and converged toward the lower end is provided with a plurality of pores through which the gas-removed lubricant flows out of the chamber. On the other hand, the gas-rich lubricant is discharged by a pipe which extends into the chamber along its axis and has a plurality of orifices formed in the substantially whole portion within the chamber.

In the above proposed device, gas-containing lubricant is introduced tangentially into the chamber at the upper cylindrical portion of the funnel-shaped wall, and the gaseous contaminants are instantaneously collected around the upper portion of the pipe. Since a diameter of the chamber becomes smaller toward the lower end with reducing a distance between the funnel-shaped wall and the pipe, the lubricant containing little gaseous contaminants approaches the pipe at the lower portion thereof and flows into the pipe through the orifices to mix with the pre-removed gas-rich lubricant. Thus, separation of the gaseous contaminants in the above proposed device is still considered unsatisfactory for practical use.

SUMMARY OF THE INVENTION

Accordingly, an object of the invention is to provide an improved oil filter of the above type which permits gaseous contaminants to be sufficiently removed from the oil while preventing the gas-removed oil from mixing with pre-removed gaseous contaminants.

According to the present invention, an oil filter comprises a housing opened at one end thereof, a cylindrical first separator unit disposed in the housing for removing solid contaminants from the oil introduced into the housing, and a second separator unit disposed within the first separator unit for removing gaseous contaminants from the oil that has passed through the first separator unit, the second separator unit including a funnel-shaped cyclone defining a chamber adapted to generate a vortical flow of the oil introduced therein to thereby separate gas-rich oil and a removal pipe extending into the chamber along an axial center thereof for discharging the gas-rich oil. The improvement comprises a wall of the cyclone defining the chamber having a lower portion and an upper portion, and a plurality of pores formed in the lower portion for allowing the oil to flow out of the cyclone. The removal pipe includes an upper end portion positioned above the lower portion of the wall of cyclone, the upper end portion being formed with a plurality of orifices for permitting the gas-rich oil to flow into the removal pipe. The pores and the orifices are arranged in such a manner that they do not overlap with each other in the axial direction of the chamber.

The oil introduced into the chamber flows toward its converged end with vortical pattern. The uniform or non-porous surface of upper portion of the cyclone ensures a smooth vortical flow, so that the gas-rich oil may sufficiently be separated and gathers around the axial center of the chamber where it flows into the removal pipe through the orifices. The remaining oil, which contains little gaseous contaminants, is collected in the lower portion of the chamber and discharged outside thereof through the pores. A portion of the removal pipe extending there is however imperforated, preventing the oil from flowing into the pipe and mixing with the gaseous contaminants.

In one embodiment of the invention, the lower and upper portions of the cyclone have substantially equal length, and the upper end portion of the removal pipe terminates at a level corresponding to a border between the lower and upper portions of the cyclone. The pores may be formed in the whole area of the lower portion and the orifices may be formed in the whole area of the upper end portion. Alternatively, the lower portion may include a non-porous zone adjacent the border and/or the upper end portion may include an imperforated zone adjacent the lower edge thereof.

Other objects, features and advantages of the invention will be apparent from the following description of the preferred embodiments thereof when taken in conjunction with the accompanying drawings.

DESCRIPTION OF THE PREFERRED EMBODIMENTS

Figure 1:
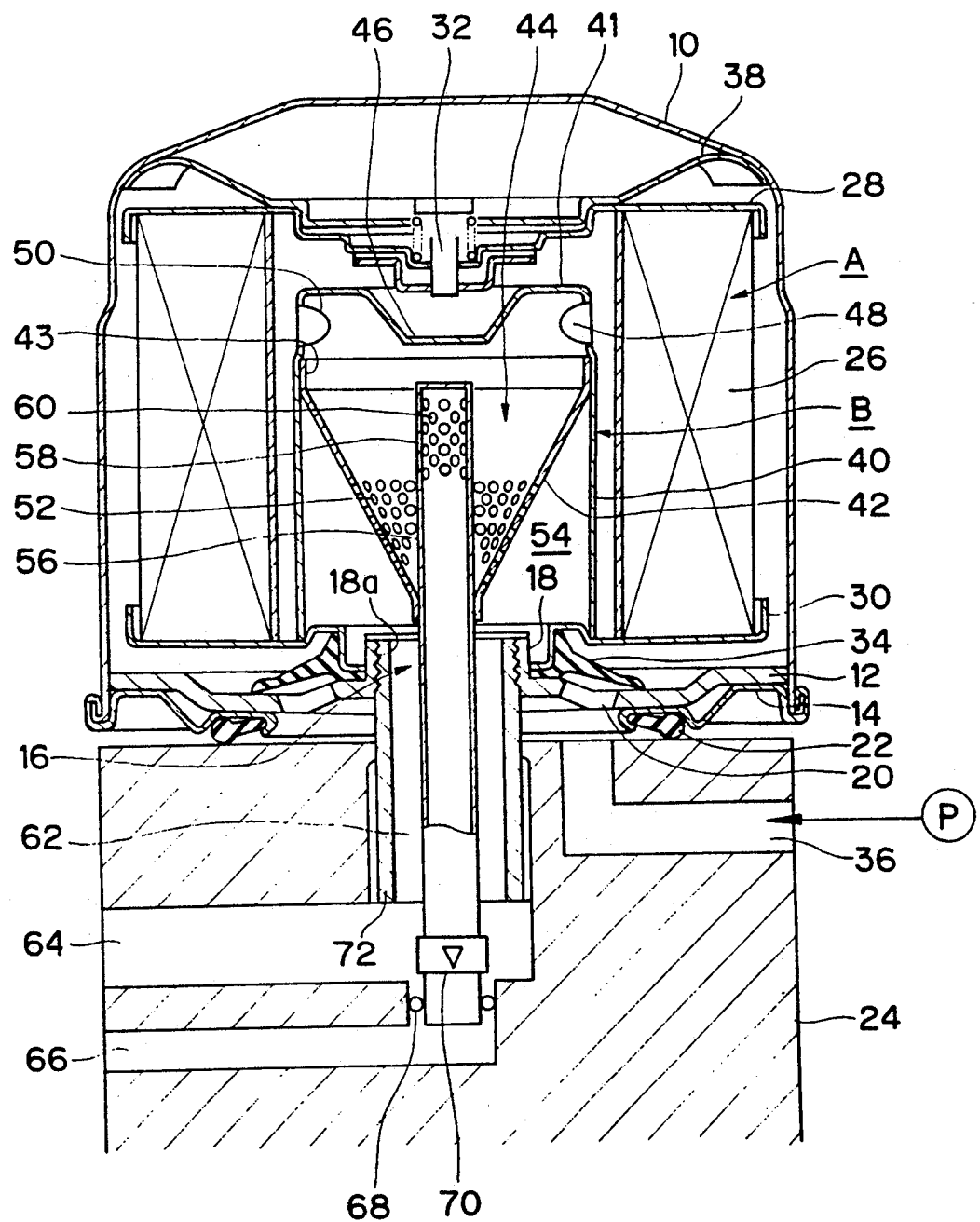
FIG. 1 is a longitudinally sectioned elevational view illustrating an oil filter according to an embodiment of the invention.

Referring first to FIG. 1 of the drawings, an oil filter according to a preferred embodiment of the invention has a housing 10 of substantially cylindrical shape having a lower open end and an upper closed end. A base plate or disk 12 is secured to an inner peripheral surface of the housing 10 at a position near its lower end and is fixedly supported by means of a ring member 14 of which outer edge is seamed with the lower edge of the housing 10. The base plate 12 is formed with a central opening 16 defined by an upwardly projecting circular wall 18 which has a threaded inner surface 18a. An aperture 20 is provided in the base plate 12 radially outward of the opening 16, and is surrounded by a gasket 22 that seals a space between the base plate 12 and an upper surface of a mount block 24 to which the housing 10 is attached.

Arranged within the housing 10 are a separator unit A for separating or filtering solid contaminants from an oil circulating in a lubricating system of a machine, and a separator unit B for separating gaseous contaminants in the oil. The separator unit A is of usual type and comprises a filter element 26, an upper end plate 28 and a lower end plate 30 both fixed to the element 26. The filter element 26 has a hollow cylindrical shape and is typically formed of a pleated sheet of paper. The upper end plate 28 extends radially inward to support a relief valve 32 which is positioned substantially at a center of the housing 10. This relief valve 32 is adapted to open and provide a bypass passage for the oil when a pressure of oil is increased outside the filter element 26 due to a clogging thereof, so that the oil may flow through the valve 32 into the space defined within the element 26. On the other hand, the lower end plate 30 extends to the wall 18 where a check valve 34 is secured for preventing a reverse flow of the oil from the housing 10 into an inlet passage 36 that is formed in the mount block 24 and communicates with the aperture 20 in the base plate 12. The unit A is held in position by a spring 38 which is compressed between the upper end of the housing 10 and the upper end plate 28.

The separator unit B is disposed at the center of the housing 10 coaxially with the separator unit A. The unit B includes a cylindrical casing 40 of which lower edge is secured to the extension of the end plate 30. A funnel-shaped member or cyclone 42 is housed within the casing 40 and is attached at its upper vertical portion 43 to the peripheral surface of the casing 40, defining together with a bottom wall 41 of the casing 40 a chamber 44 which is adapted to generate a vortical flow of the oil as described hereinafter. The bottom wall 41 has at a center thereof a concave portion 46 projecting into the chamber 44. Formed through the peripheral wall of the casing 40 at a position above the cyclone 42 are a plurality of circumferentially spaced inlets 48 for introducing the oil into the chamber 44. The inlet 48 is formed by punch press with providing a guide plate or deflector 50 extending inwardly relative to tangent of the casing 40 at the inlet 48, so that the oil introduced therethrough flows in a vortical pattern. The concave portion 46 preferably extends to a level equal to or below the inlet 48 in order to fully contribute to the generation of vortical flow.

A number of pores 52 are formed through the wall of lower portion of cyclone 42 to connect the chamber 44 with a space 54 which is defined between the cyclone 42 and the casing 40 and communicates with the central opening 16. A removal pipe 56 having an upper closed end extends in the opening 16 and projects into the cyclone 42, the closed end being positioned at a level of the upper vertical portion 43. The lower vertical portion of cyclone 42 is fixed to the removal pipe 56 to orient the latter along the axial center of the chamber 44. An upper end portion 58 of removal pipe 56 is perforated to provide a number of orifices 60 through which a gas-rich oil flows into the pipe. Details of these pores 52 and orifices 60 will be discussed hereinbelow.

The mount block 24 has a central hole 62 which is aligned with the opening 16 and communicates with a first outlet passage 64 formed in the block 24. The removal pipe 56 extends through the central hole 62 and in the first outlet passage 64, and its lower end opens into a second outlet passage 66 that is also formed in the block 24 below the first passage 64. An O-ring 68 is provided around the removal pipe 56 to separate the first and second outlet passages from each other. The first passage 64 is connected to, for example, an engine (not shown) to be lubricated while the second passage 66 is connected to, for example, an oil pan (not shown) for storing the oil. A pressure-regulating valve 70 is disposed in the removal pipe 56 and adapted to open for discharging the gas-rich oil to the oil pan through the second passage 64 when a pressure in the pipe 56 exceeds a predetermined value. Fitted in the central hole 62 is a sleeve 72 which extends into the opening 16 to threadedly engage with the wall 18 of the base plate 12, thereby attaching the housing 10 to the block 24.

Figure 2:
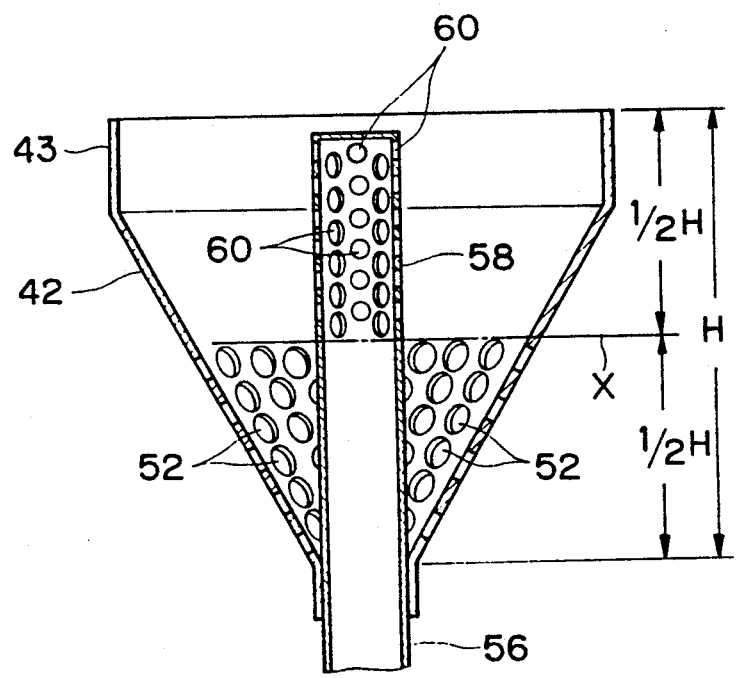
FIG. 2 is an enlarged schematic view of a cyclone and a removal pipe.

As shown in FIG. 2, the pores 52 in the wall of cyclone 42 are formed only in the lower portion thereof. More specifically, the area where the pores 52 are provided occupies a lower half of a height indicated by a letter H of cyclone 42 including the upper vertical portion 43 but excluding the lower vertical portion which does not define the chamber 44. An upper half of cyclone 42 is thus imperforated. On the other hand, the perforated upper end portion 60 of removal pipe 56 is positioned in the chamber 44 defined by the upper half of cyclone 42 where no pores 52 exist. In the illustrated example, the perforated portion 60 terminates precisely at a border X between the upper and lower halves, and therefore there is no overlapping area for the pores 52 and orifices 60. If desired, however, the perforated portion 60 may terminate at a level above the border X and/or the porous area of cyclone 42 may end at a level below the border X, the essential requirement being to substantially avoid the overlapping of the perforated portion of removal pipe and the porous area of cyclone. Diameters of pores 52 and orifices 60, as well as area ratios thereof, should be so determined as to maintain a pressure loss below a desired value.

When the oil is supplied by a pump P via the inlet passage 36, it flows into the oil filter through the aperture 20 and the check valve 34. The oil then passes through the filter element 26 from the outside to inside during which solid contaminants are removed from the oil. The thus filtered oil flows in the space between the element 26 and casing 40 and is introduced into the chamber 44 through the inlets 48 which, together with the deflector 50, contributes to the creation of vortical flow. The concave portion 46 prevents the oil from flowing radially inwardly and intensifies the vortical flow. The oil flows downward in the chamber 44 with the vortical pattern, generating a centrifugal force which acts on the oil. Due to a difference in density, the oil containing gaseous contaminants, i.e. gas-rich oil, is separated and gathers near the axial center of the flow where it is introduced through the orifices 60 into the removal pipe 56 for discharge into the oil pan via the second outlet passage 66. Since the upper portion of cyclone 42 has no pores, the wall thereof ensures smooth flow of the oil with vortical pattern to generate the centrifugal force sufficient to separate the gas-rich oil. Also, it prevents the non-separated oil from flowing into the space 54.

On the other hand, the remaining oil, which contains little gaseous contaminants, flows around the wall of cyclone 42 and passes through the pores 52 formed in the lower portion thereof into the space 54 for circulation in the lubricating system via the central opening 16, hole 62 and the first outlet passage 64. As the diameter of chamber 44 becomes narrower toward its lower end, the oil flow approaches the removal pipe 56 in the lower area of the chamber. However, the fact that the portion of removal pipe 56 extending in that area is imperforated prevents the oil having little gaseous contaminants from flowing into the pipe 56 and mixing with the pre-removed contaminants. Thus, only the gas-rich oil returns to the oil pan without being used for lubrication.

Although the present invention has been described with reference to the preferred embodiments thereof, many modifications and alterations may be made within the spirits of the invention.

What is claimed is:

1. An oil filter comprising a housing opened at one end thereof, a cylindrical first separator unit disposed in said housing for removing solid contaminants from the oil introduced into said housing, and a second separator unit disposed within said first separator unit for removing gaseous contaminants from the oil that has passed through said first separator unit, said second separator unit including a funnel-shaped cyclone defining a funnel-shaped chamber for generating a vortical flow of the oil introduced therein to thereby separate gas-rich oil and a removal pipe extending into said chamber along an axis thereof for discharging said gas-rich oil, the improvement comprising:

a wall of said cyclone defining said chamber having a first portion and a second portion, and a plurality of pores formed in said first portion for allowing the oil to flow out of said cyclone, said first portion having a smaller mean diameter than that of said second portion; and an end portion of said removal pipe positioned adjacent said second portion of said wall of cyclone, said end portion of said removal pipe being formed with a plurality of orifices for permitting said gas-rich oil to flow into said removal pipe;

said first portion and said end portion being arranged in such a manner that they do not overlap with each other in a direction along the axis of said chamber.

2. An oil filter as claimed in claim 1, wherein said first portion and said second portion of said wall of said cyclone have substantially equal length as measured along said axis and wherein said orifices in said end portion of said removal pipe terminate at a level corresponding to a border between said first and second portions.

3. An oil filter as claimed in claim 2, wherein said pores are formed in the whole are of said first portion of said wall and said orifices are formed in the whole area of said end portion of said removal pipe.

4. An oil filter as claimed in claim 2, wherein said first portion of said wall includes a non-porous zone adjacent the border.

5. An oil filter as claimed in claim 2, wherein said end portion of said removal pipe includes an imperforated zone in the region of said border.

6. An oil filter as claimed in claim 1, wherein said second separator unit further comprises a cylindrical casing surrounding said funnel shaped cyclone having an open end adjacent said first portion, a closed end, adjacent said second portion and an inner surface.

7. An oil filter as claimed in claim 6, wherein said wall of said cyclone includes a portion attached to the inner surface of said casing.

8. An oil filter as claimed in claim 1, wherein said cyclone has a section integral with said wall defining said chamber and wherein said removal pipe is tightly fitted in said section.

9. An oil filter as claimed in claim 1, where said end portion of said removal pipe is positioned in a region adjacent said second portion of said cyclone.

* * * * *